Patented June 13, 1933

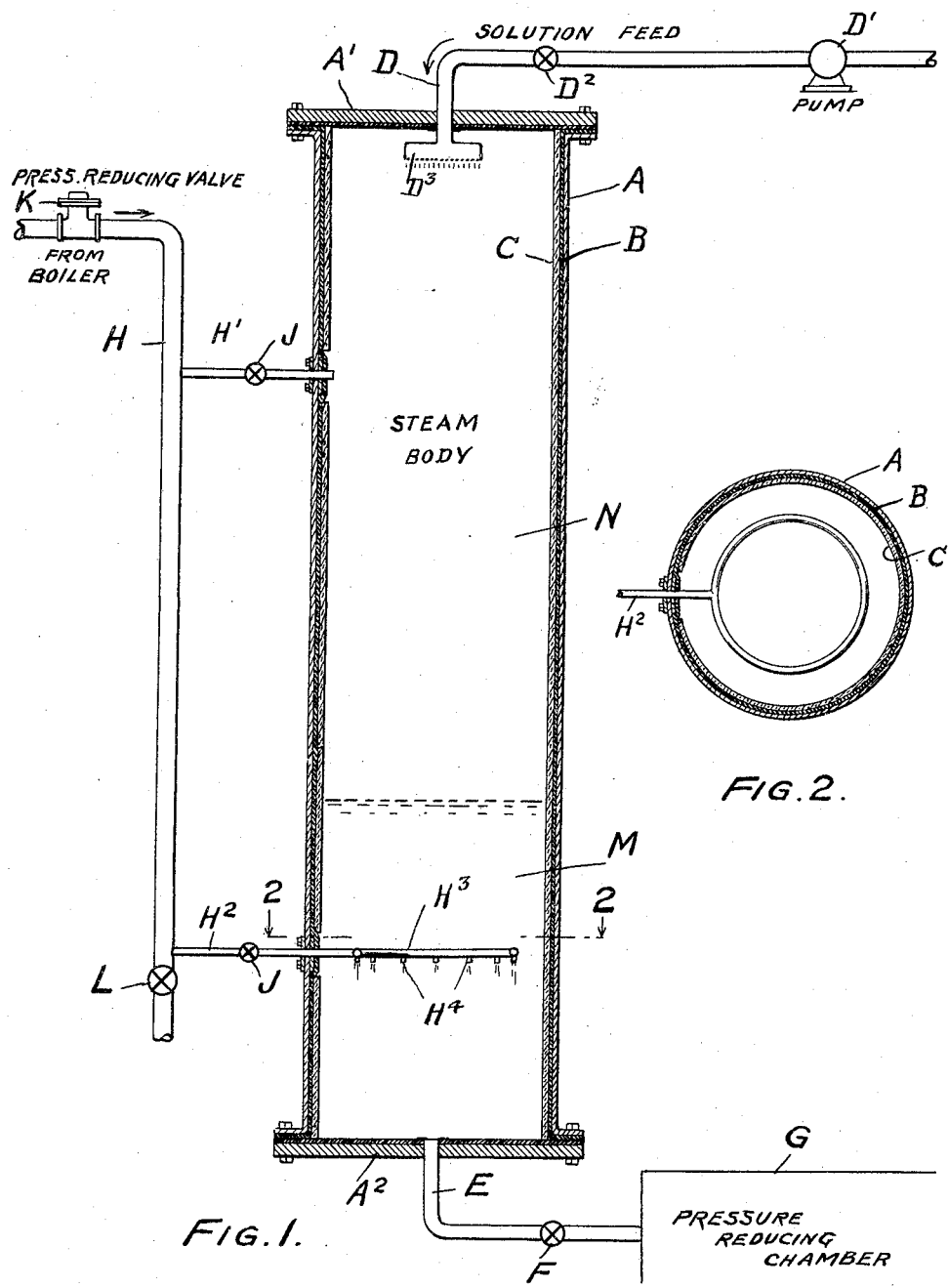

1,914,175

UNITED STATES PATENT OFFICE

GORDON R. STEUART, DECEASED, LATE OF DENVER, COLORADO, BY KATHERINE STEUART, ADMINISTRATRIX, OF DENVER, COLORADO, ASSIGNOR, BY MESNE ASSIGNMENTS, TO KALUNITE COMPANY, A CORPORATION OF DELAWARE

METHOD OF MANUFACTURING BASIC ALUM FROM NORMAL ALUM SOLUTIONS

Application filed April 22, 1932. Serial No. 606,787.

The invention relates to a manufacturing process of precipitating from a normal alum solution a precipitate consisting of a basic alum. By a basic alum is meant an alum compound of an alkali and, or, ammonium sulphate and a basic aluminum sulphate and water.

It is known that a normal alum solution, when heated to a sufficient degree, will precipitate a basic alum, with the formation of a mother liquor containing the sulphuric acid generated in the reaction and eliminated from the normal sulphate of alumina constituent of the normal alum, together with a portion of the alkali metal or ammonium sulphate of the normal alum which is not required for the composition of the basic alum. It is also known that the reaction above indicated is facilitated by mixing the normal alum solution with a solution of alkali or ammonium sulphate, preferably in quantity equivalent to the alkali or ammonium sulphate content of the normal alum. While the reaction above indicated is known, it has not, so far as is learned, gone into practical use, principally for the reason that no satisfactory method has been provided for carrying it into effect on a manufacturing scale and the object of my invention is to provide a manufacturing process, by means of which the basic alum can be produced rapidly, efficiently, and cheaply.

In a sense, the present application covers a modification of a process described in co-pending application, filed April 22, 1932, Serial No. 606,786 in accordance with which a normal alum solution is fed in a continuous stream to a suitable high pressure conduit container and heated during its passage through such container by injecting high pressure steam into the flowing stream of alum solution.

The present invention consists, broadly speaking, in maintaining in the upper part of a conduit container a body of high pressure steam contained at a proper reactive temperature by a constant inflow of high pressure steam and overlying a body of liquid maintained in the lower part of the conduit container, said body of liquid consisting of the mother liquor from which the basic alum is precipitated, together with more or less undecomposed normal alum solution and carrying in suspension the precipitate of basic alum, the outflow of this liquid from the container being regulated to maintain its volume and level at an approximately constant amount. In accordance with this process, the alum solution is injected into the container so that it will fall through the body of high pressure steam in a series of streams and be heated by absorption from the steam, of sufficient heat to raise its temperature to the point at which basic alum is formed. It will be understood that the inflow of alum solution and of steam will be so regulated that the outflow of liquid from the conduit container will correspond with the inflow of solution and of water condensed from the steam so that the volume of high pressure steam and the level of the liquid in the container will remain approximately constant.

The temperature to which the solution must be heated must, for any practical production of basic alum, exceed 140° C. and, for the best results, it has been found that the solution must be heated to a temperature of approximately 185° to 200° C. The precipitation at the preferred temperatures is exceedingly rapid, in the treatment of a normal alum solution without addition of excess alkali or ammonium sulphate the precipitation is approximately 85% of the contained alumina, taking place under conditions in which the solution passes through the conduit container in from six to ten minutes and a precipitation of approximately 95% taking place where the excess alkali or ammonium sulphate is mixed with the alum solution.

It has been found that the process indicated above can be carried on without liability to interruptions and that it is adapted to produce a precipitate of basic alum of exceedingly fine particle size, which is desirable for certain commercial purposes, such as used for pigments or fillers and for effecting rapidly certain chemical reactions of the basic alums with solids or liquids. The particle size, however, can be measurably controlled by regulating the height of the body of high pressure steam through which the solution is permitted to fall and, where incomplete precipitation occurs during the travel of the solution through the steam, the precipitation of the basic alum can be continued in the liquid body, in which case additional high pressure steam should be fed into this liquid body to raise and maintain it to a temperature through which precipitation occurs under advantageous conditions. Where the method is carried on under conditions last mentioned, small crystals of basic alum precipitated during the passage of the streams of solution through the steam will be built up and enlarged by the additional basic alum precipitated in the liquid body.

Working with a conduit container in which the steam body was maintained at a height of about ten feet and in which a solution of a normal ammonium alum, mixed with a solution of ammonium sulphate, equivalent to that present in the ammonium alum, was injected into the top of the steam body in about thirty streams issuing from holes three-thirty-seconds of an inch in diameter, the average diameter of the particles of basic ammonium alum precipitated was approximately one micron and the reaction was practically at the equilibrium point. By decreasing the height of the steam body and correspondingly increasing the height of the liquid, it is practical to very materially increase the particle size of the precipitate as in such cases complete precipitation does not take place during the passage of the solution through the steam but continues in the liquid body underlying the steam, with the result that small crystals formed in the solution in its passage through the steam are built up by a further precipitation of basic alum in the liquid body.

The consumption of saturated steam at approximately two hundred pounds gauge pressure in the process will be about 4.2 pounds per pound of alumina precipitated as basic alum when the initial alum solution has a concentration of 80% alum and is introduced into the conduit container at a temperature of 100° C. A greater amount of steam may be supplied with the result of speeding up the precipitation of the basic alum and increasing the rate of flow of the solution through the conduit container. The use of a smaller quantity of steam would, naturally, result in a slower precipitation of the basic alum and, for complete precipitation, would require that the flow of the solution through the conduit container should be made correspondingly slower.

Figure 1 is a vertical sectional elevation of a conduit container adapted for use in the practice of the invention, the section being taken along the line at which the steam pipes enter the container, and Figure 2 is a cross sectional plan view taken on the line 2—2 of Figure 1.

A indicates the outer shell of the container or autoclave which is preferably made of steel and of sufficient strength to sustain the pressure to which it is subjected. $A^1$ indicates the upper head of the autoclave and $A^2$ the lower head. B indicates the lining of non-reactive metal, preferably lead, and C the inner lining of non-reactive inert refractory material, such as acid proof tiles. D indicates the inlet conduit through which the alum solution is continuously forced into the autoclave under a pressure somewhat exceeding that existing in the autoclave. By preference this conduit terminates at the upper end of the conduit container in a perforated head $D^3$. $D^1$ indicates a pump for forcing the solution into the container and $D^2$ a valve for regulating the flow of solution to the container. E indicates an outlet conduit leading from the bottom of the autoclave and F indicates a valve for regulating the orifice through which the liquid is delivered from the conduit container. G indicates a container into which the solution, and the precipitate formed therefrom, flows from the exit orifice of the autoclave and from which steam is permitted to escape under preferably regulated conditions, with the effect of rapidly reducing the temperature of the solution. H indicates a steam header connected with a source of steam under pressure exceeding that existing in the autoclave. $H^1$ indicates a steam pipe leading from the header to the upper portion of the conduit container, that is, the portion which in the use of the apparatus is maintained full of high pressure steam. $H^2$ is another steam conduit leading from the header into the lower portion of the conduit container, that is, the portion which in the use of the apparatus is maintained charged with liquid. This lower steam pipe is turned into a ring $H^3$ formed inside of the container with outlet openings, preferably in the form of nozzles $H^4$. Each of the pipes $H^1$ and $H^2$ is provided with a regulating valve indicated at J and a pressure regulating valve, as indicated at K, is provided in the conduit leading to the header. M indicates the body of liquid maintained in the lower portion of the conduit container and N the body of high pressure steam contained in the upper portion of the conduit container.

In starting the apparatus, liquid is charged into the conduit container to a height of approximately one-third of the length of the container and steam at a pressure of approximately two hundred and fifty pounds is charged into the upper part of the conduit container with admission of steam into the liquid filled lower portion of the container, sufficient to raise its temperature to approximately 200° C. The discharge valve is then opened to provide an exit orifice of such regulated area as will maintain an outlet flow from the conduit container equal to the inflow of solution, together with the water resulting from the condensation of the heated steam and the normal alum solution is then forced into the upper portion of the conduit container and falls through the steam filled space of the container in numerous streams which, in falling through the steam space, are heated up to approximately 200° C.

The precipitation of the basic alum from the normal alum solution occurs very rapidly at this temperature and this precipitation, of course, will continue in the liquid body maintained at the base of the conduit container, which is maintained at a proper reactive temperature by the admission of steam through the steam pipe $H^2$, in case conditions of equilibrium have not been reached through the passage of solution through the steam space.

By decreasing the amount of steam admitted into the steam space and proportionately increasing the amount of steam admitted into the lower liquid filled portion of the apparatus, it is practical to obtain an increase in the particle size of the precipitate, the particle size of which precipitate will vary in accordance with the rapidity of the reaction which results in its formation.

In practice it has been found that, under the conditions indicated above, the solution will be heated to the proper reactive temperature if its passage through the conduit container is so regulated as to occupy from six to ten minutes.

While the process may be carried on in various forms of apparatus, it is stated that the apparatus illustrated is designed to employ a conduit container of about twenty feet in length and an interior diameter of four feet.

Having now described the invention, what is claimed as new and desired to secure by Letters Patent, is:

1. The method of producing a precipitated basic alum which consists in maintaining in a suitable high pressure conduit container a body of high pressure steam maintained in approximately uniform pressure and volume by the constant admission of steam to the container and a body of liquid containing precipitated basic alum, maintained at an approximately uniform level by regulating its rate of outflow from the container and feeding into the body of high pressure steam streams of a solution of a normal alum in such manner as to raise the temperature of the alum solution by absorption of heat from the steam as it passes through the steam.

2. The method of claim 1, in which additional high pressure steam is fed into the body of liquid maintained in the lower part of the conduit container, to maintain said liquid at a temperature at which precipitation of basic alum from a normal alum solution will take place.

KATHERINE STEUART,
*Administratrix of the Estate of Gordon R. Steuart, Deceased.*